United States Patent
Mulvaney et al.

(10) Patent No.: US 10,491,264 B1
(45) Date of Patent: Nov. 26, 2019

(54) COMBINED DEMODULATOR AND DESPREADER

(71) Applicant: Analog Devices Global Unlimited Company, Hamilton (BM)

(72) Inventors: Kenneth Joseph Mulvaney, Cork (IE); Dermot G. O'Keeffe, Blarney (IE); Philip Eugene Quinlan, Cork (IE)

(73) Assignee: Analog Devices Global Unlimited Company, Hamilton (BM)

( * ) Notice: Subject to any disclaimer, the term of this patent is extended or adjusted under 35 U.S.C. 154(b) by 0 days.

(21) Appl. No.: 16/186,814

(22) Filed: Nov. 12, 2018

(51) Int. Cl.
*H04B 1/709* (2011.01)

(52) U.S. Cl.
CPC ... *H04B 1/709* (2013.01); *H04B 2201/70713* (2013.01); *H04B 2201/70714* (2013.01)

(58) Field of Classification Search
CPC .......... H04B 1/709; H04B 2201/70714; H04B 2201/70713
USPC ........................................................ 375/150
See application file for complete search history.

(56) References Cited

U.S. PATENT DOCUMENTS

| | | | |
|---|---|---|---|
| 4,475,219 A | 10/1984 | Puckette | |
| 4,647,864 A | 3/1987 | Rafferty et al. | |
| 5,040,192 A | 8/1991 | Tjahjadi | |
| 5,157,686 A | 10/1992 | Omura et al. | |
| 5,208,829 A * | 5/1993 | Soleimani | H04B 1/707 375/141 |
| 5,237,587 A * | 8/1993 | Schoolcraft | H04B 1/707 375/150 |
| 5,307,380 A | 4/1994 | Kume | |
| 5,353,301 A * | 10/1994 | Mitzlaff | H04B 1/707 375/149 |
| 5,495,203 A | 2/1996 | Harp et al. | |
| 5,511,097 A | 4/1996 | Tsumura | |
| 5,610,940 A | 3/1997 | Durrant et al. | |
| 6,363,106 B1 | 3/2002 | Popovic et al. | |
| 6,456,608 B1 | 9/2002 | Lomp | |
| 7,397,300 B2 | 7/2008 | Quinlan et al. | |
| 7,477,707 B2 | 1/2009 | Kazi et al. | |
| 8,324,962 B2 | 12/2012 | Mulvaney | |
| 8,483,574 B2 | 7/2013 | Zhang et al. | |
| 9,820,230 B2 | 11/2017 | Balakrishnan et al. | |
| 2005/0089120 A1 | 4/2005 | Quinlan et al. | |

* cited by examiner

*Primary Examiner* — Juan A Torres
(74) *Attorney, Agent, or Firm* — Knobbe Martens Olson & Bear LLP (57) ABSTRACT

RF communication systems that provide combined demodulation and despreading are provided herein. In certain embodiments, an RF communication system generates an in-phase (I) signal and a quadrature-phase (Q) signal based on processing a received spread spectrum signal carrying a sequence of data symbols. The data symbols each have a symbol period and are coded by one or more multi-bit spreading codes. The RF communication system includes a symbol correlator that delays the I signal and the Q signal by an integer number of symbol periods to thereby generate a delayed I signal and a delayed Q signal, respectively. Additionally, the symbol correlator generates a correlation signal based on correlating the delayed I signal to the I signal and correlating the delayed Q signal to the Q signal. The RF communication system processes the correlation signal to recover the sequence of data symbols.

20 Claims, 9 Drawing Sheets

| PREAMBLE | SFD | FRAME LENGTH (7 BITS) | RESERVED (1 BIT) | PSDU |
|---|---|---|---|---|
| SYNCHRONIZATION HEADER 81 | | PHY HEADER 82 | | PHY PAYLOAD 83 |
| | | 1 | | VARIABLE |
| | | OCTETS | | |

COMBINED DEMODULATOR AND DESPREADER

FIELD OF THE DISCLOSURE

Embodiments of the invention relate to electronic systems, and more particularly, to radio frequency (RF) communication systems.

BACKGROUND

Certain types of RF communication systems wirelessly communicate with one another using data that is not only modulated, but also spread in frequency using spread-spectrum technology. For example, a first RF communication system can include a modulator for modulating data and a spreader for spreading the modulated data using a spreading code to generate a spread spectrum signal for wireless transmission. Additionally, a second RF communication system receives the spread spectrum signal, which is despread by a despreader and demodulated by a demodulator to recover the data.

SUMMARY OF THE DISCLOSURE

RF communication systems that provide combined demodulation and despreading are provided herein. In certain embodiments, an RF communication system generates an analog in-phase (I) signal and an analog quadrature-phase (Q) signal based on downconverting a spread spectrum signal carrying a sequence of data symbols each having a symbol period and coded by one or more multi-bit spreading codes. The RF communication system further includes analog-to-digital conversion circuitry that generates digital data representing the analog I signal and the analog Q signal, and a combined demodulation and despreading circuit that delays the digital data by a delay of at least one symbol period of the sequence to generate delayed digital data. The combined demodulation and despreading circuit recovers the sequence of data symbols based on correlating the delayed digital data to the digital data. By performing symbol correlation in this manner, multiple bits carried by the symbol are resolved, and combined demodulation and despreading is achieved. Providing combined demodulation and despreading can provide a number of advantages, including, but not limited to, lower power dissipation and/or reduced complexity.

In one aspect, an RF communication system with combined demodulation and despreading is provided. The RF communication system includes an antenna configured to receive a spread spectrum signal carrying a sequence of data symbols coded by at least one spreading code, a pair of mixers configured to downconvert the spread spectrum signal to generate an analog I signal and an analog Q signal, analog-to-digital conversion circuitry configured to generate digital data representing the analog I signal and the analog Q signal, and a combined demodulation and despreading circuit configured to delay the digital data by a delay of at least one symbol period of the sequence to generate delayed digital data, and to recover the sequence of data symbols based on correlating the delayed digital data to the digital data.

In another aspect, a method of receiving spread spectrum signals with combined demodulation and despreading is provided. The method includes receiving a spread spectrum signal carrying a sequence of data symbols coded by at least one spreading code, downconverting the spread spectrum signal to generate an analog I signal and an analog Q signal, generating digital data representing the analog I signal and the analog Q signal, delaying the digital data by a delay of at least one symbol period of the sequence to generate delayed digital data, and recovering the sequence of data symbols based on correlating the delayed digital data to the digital data.

In another aspect, a combined demodulation and despreading circuit is provided. The combined demodulation and despreading circuit includes a symbol correlator configured to receive digital data including an I signal and a Q signal representing a spread spectrum signal carrying a sequence of data symbols coded by at least one spreading code. The symbol correlator includes delay circuitry configured to delay the digital data by a delay of at least one symbol period of the sequence to generate delayed digital data, and correlation circuitry configured to generate a correlation signal based on correlating the delayed digital data to the digital data. The combined demodulation and despreading circuit further includes a differential decoder configured to process the correlation signal to recover the sequence of data symbols.

DETAILED DESCRIPTION OF EMBODIMENTS

The following detailed description of embodiments presents various descriptions of specific embodiments of the invention. However, the invention can be embodied in a multitude of different ways as defined and covered by the claims. In this description, reference is made to the drawings where like reference numerals may indicate identical or functionally similar elements. It will be understood that certain embodiments can include more elements than illustrated in a drawing and/or a subset of the elements illustrated in a drawing. Further, some embodiments can incorporate any suitable combination of features from two or more drawings.

RF communication systems that provide combined demodulation and despreading are provided herein. In certain embodiments, an RF communication system generates an in-phase (I) signal and a quadrature-phase (Q) signal based on processing a received spread spectrum signal carrying a sequence of data symbols. The data symbols each have a symbol period and are coded by one or more multi-bit spreading codes. The RF communication system includes a symbol correlator that delays the I signal and the Q signal by an integer number of symbol periods to thereby generate a delayed I signal and a delayed Q signal, respectively. Additionally, the symbol correlator generates a correlation signal based on correlating the delayed I signal to the I signal and correlating the delayed Q signal to the Q signal. The RF communication system processes the correlation signal to recover the sequence of data symbols.

Thus, the symbol correlator operates with a delay that is an integer number of symbol periods such that a pair of data symbols are overlaid and correlated to one another. In certain configurations, each received symbol is spread using a common spreading code, and the symbol correlator operates with one symbol delay ($T_{SYMBOL}$). Thus, adjacent data symbols in the symbol sequence can be compared.

However, other implementations are possible. For example, in certain communication protocols a spreading code is regularly changed. For instance, in IEEE 802.15.4g-18.3, the spreading code is alternated between transmitting symbols such that odd data symbols in the symbol sequence are coded with a first spreading code and even symbols in the symbol sequence are coded with a second spreading code. In such implementations, the symbol correlator can operate with a multiple of the symbol delay, for instance, $2*T_{SYMBOL}$ for IEEE 802.15.4g-18.3. Thus, symbol correlators implemented in accordance with the teachings herein can operate with a delay for correlation of about $n*T_{SYMBOL}$, where n is an integer greater than or equal to 1.

In certain implementations, the symbol correlator processes a digital I signal and a digital Q signal that collectively represent the received spread spectrum signal. Additionally, the symbol correlator delays each of the digital I signal and the digital Q signal by an integer number of symbol periods to thereby generate a delayed digital I signal and a delayed digital Q signal. The symbol correlator multiples the digital I signal and the delayed digital I signal to generate a multiplied digital I signal, and multiplies the digital Q signal and the delayed digital Q signal to generate a multiplied digital Q signal. Additionally, the symbol correlator adds the multiplied digital I signal and the multiplied digital Q signal to generate a digital correlation signal that provides strong discrimination at the symbol level.

By performing symbol correlation in this manner, multiple bits carried by the symbol are resolved, and combined demodulation and despreading is achieved. Providing combined demodulation and despreading can provide a number of advantages, including, but not limited to, lower power dissipation and/or reduced complexity.

Moreover, a clock-and-data recovery (CDR) circuit that processes the bitstream identifying the recovered sequence of data symbols can be operated at a slower rate relative to an implementation in which demodulation and despreading is performed separately. For example, by performing combined demodulation and despreading, the CDR circuit can advantageous operate at the slower symbol rate rather than at a faster chipping rate corresponding to a time period between individual bits of the spreading code.

In certain implementations, the RF communication system includes a differential decoder that processes the correlation signal to recover the sequence of data symbols. For example, the correlation signal from the symbol correlator can indicate whether or not the next data symbol is the same or different as the previous data symbol in the symbol sequence. Thus, the differential decoder can use the value of the previous data symbol and the correlation signal to determine the next data symbol in the symbol sequence.

In applications in which a spreading code is alternated for even and odd symbols (for instance, as in IEEE 802.15.4g-18.3), the differential decoder can decode the next even data symbol based on the previous even data symbol in the symbol sequence and the correlation signal, and decode the next odd data symbol in the symbol sequence based on the previous odd data symbol and the correlation signal.

In certain implementations, the spread spectrum signal is received in a packet based format. A header of a packet can include a sequence of known data symbols that are transmitted in a preamble and/or start of frame delimiter (SFD). In certain implementations, the differential decoder determines the symbol value of a first or initial data symbol in the symbol sequence based on comparison to a known data symbol from the header. Thus, the differential decoder can use a data symbol recovered from the header as a starting point for decoding the sequence of data symbols carried in the packet's payload.

However, other implementations of determining the value of the initial data symbol of the symbol sequence are possible. For instance, in another example, the differential decoder includes an error checking circuit that performs error checking, such as a cyclic code redundancy error check, based on assuming different values for the initial data symbol. Thus, multiple bitstreams can be decoded and processed for error checking, and the assumed symbol value corresponding to the sequence that passes error checking with no errors or the fewest errors can be assumed to be the correct initial symbol value.

Figure 1:
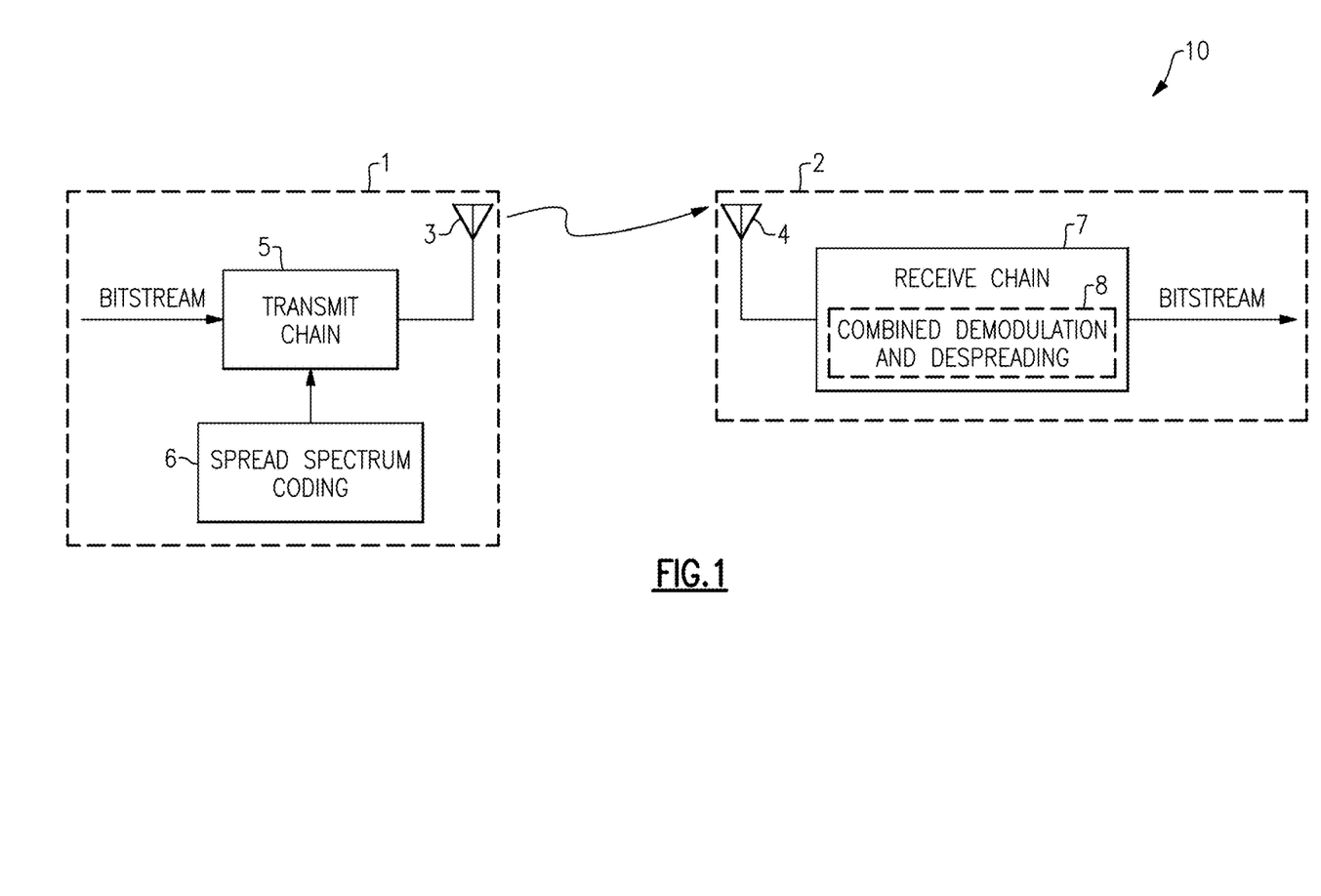
FIG. 1 is a schematic diagram of a spread spectrum communication link according to one embodiment.

FIG. 1 is a schematic diagram of a spread spectrum communication link 10 according to one embodiment. As shown in FIG. 1, a first RF communication system 1 wirelessly transmits a spread spectrum signal to a second RF communication system 2.

Although FIG. 1 depicts specific implementations of RF communication systems, the teachings herein are applicable to other implementations of RF communication systems. Furthermore, although the first RF communication system 1 is illustrated as transmitting and the second RF communication system 2 is illustrated as receiving, the second RF communication system 2 can also be implemented with circuitry for transmitting and/or the first RF communication system 1 can also be implemented with circuitry for receiving. Thus, the teachings herein are applicable to both unidirectional and bidirectional communications.

In the illustrated embodiment, the first RF communication system 1 includes an antenna 3, a transmit chain 5, and a spread spectrum coding circuit 6. The transmit chain 5 receives a bitstream (for instance, from a baseband modem), which the transmit chain 5 modulates to generate a modulated signal. Additionally, the modulated signal is coded using spread spectrum coding by the spread spectrum coding circuit 6.

The transmit chain 5 can provide a wide variety of types of modulation to the bitstream. Examples of suitable types of modulation include, but are not limited to, frequency-shift keying (FSK) in which the bitstream is communicated by varying the frequency of the transmitted signal and/or phase-shift keying (PSK) in which the bitstream is communicated by varying the phase of the transmitted signal. For instance, with respect to FSK, the data can be transmitted on a carrier signal, with positive and negative frequency deviations with respect to the carrier frequency representing the transmitted data.

With continuing reference to FIG. 1, the spread spectrum coding circuit 6 provides the transmit chain 5 with one or more spreading codes used to spread the bandwidth of the modulated signal. Examples of suitable types of spread spectrum technology include, but are not limited to, direct-sequence spread spectrum (DSSS).

In certain implementations, the spread spectrum coding circuit 6 outputs a multi-bit spreading code having a symbol period ($T_{SYMBOL}$) and a chipping period ($T_{CHIP}$) between bits of the spreading code. For instance, the spreading code can include an 8-bit chipping sequence having a symbol period and a chipping period of ⅛th the symbol period.

When transmitting using certain communication protocols, the RF communication system can operate with a constant spreading code when transmitting a packet. For example, in certain implementations, a symbol representing a one ("1") is transmitted using a sequence of bits corresponding to the spreading code, and a symbol representing a zero ("0") is transmitted using a sequence of bits corresponding to a logical inverse of the spreading code (for instance, in which each bit of the spreading code is inverted or flipped). In other implementations, a spreading code is changed over time. For instance, in IEEE 802.15.4g, the spreading code is alternated between transmitting symbols such that odd data symbols in the symbol sequence are coded with a first spreading code and even symbols in the symbol sequence are coded with a second spreading code.

With continuing reference to FIG. 1, the transmit chain 5 provides a spread spectrum signal to the antenna 3 for wireless transmission. The spread spectrum signal is both modulated by the transmit chain 5 and encoded by one or more spreading codes from the spread spectrum coding circuit 6.

The second RF communication system 2 includes an antenna 4 for receiving the spread spectrum signal, and a receive chain 7 for processing the received spread spectrum signal to recover the bitstream. As shown in FIG. 1, the receive chain 7 includes a combined demodulation and despreading circuit 8 implemented in accordance with the teachings herein.

By providing combined demodulation and despreading, a number of advantages can be achieved, including, but not limited to, lower power dissipation and/or reduced complexity of the receive chain 7. Moreover, CDR circuitry of the receive chain 7 used to recover the bitstream can advantageously be operated at a relatively slow rate, for instance, the symbol period $T_{SYMBOL}$, rather than the chipping period $T_{CHIP}$.

Figure 2:
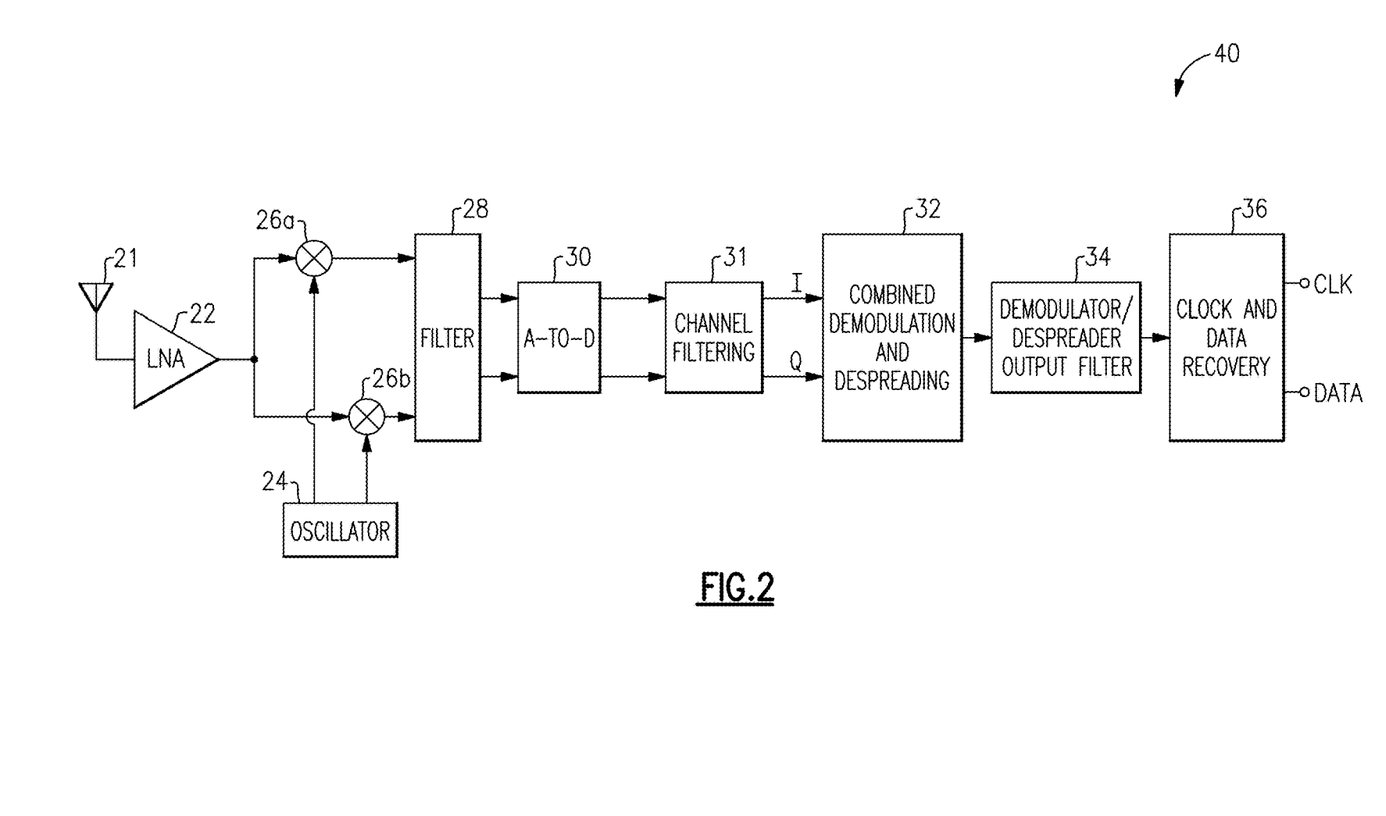
FIG. 2 is a schematic diagram of one embodiment of an RF communication system operating with combined demodulation and despreading.

FIG. 2 is a schematic diagram of one embodiment of an RF communication system 40 operating with combined demodulation and despreading. The RF communication system 40 includes an antenna 21, a low noise amplifier (LNA) 22, an oscillator 24, an in-phase (I) mixer 26a, a quadrature-phase (Q) mixer 26b, a filter 28, analog-to-digital (A-to-D) converter circuitry 30, a channel filtering circuit 31, a combined demodulation and despreading circuit 32, a demodulator/despreader output filter 34, and a CDR circuit 36.

The antenna 21 receives a spread spectrum signal that is not only modulated, but also spread by spread spectrum coding. Using spread spectrum coding to spread the bandwidth of an RF signal can provide a number of advantages, including, but not limited to, enhanced ability to receive in the presence of narrowband interferers. The spread spectrum signal received by the RF communication system 40 is spread using one or more spreading codes utilized at the transmitter, and includes a sequence of data symbols. In certain implementations, the spread spectrum signal is in a packet based format.

The RF communication system 40 can be used for receiving RF signals of a variety of communication standards, including, but not limited to, IEEE 802.15.4g, Zigbee, ISA100.11a, WirelessHART, and/or MiWi, as well as other proprietary and non-proprietary communication standards, such as those employing PSK and/or FSK modulation. The RF signals can be transmitted over a wide range of frequencies including, but not limited to, radio frequencies in very high frequency (VHF) or ultra high frequency (UHF).

The spread spectrum signal received by the antenna 21 is provided to the LNA 22, in this embodiment. The LNA 22 amplifies the spread spectrum signal to generate an amplified RF signal that is provided to an input of the I mixer 26a and to an input of the Q mixer 26b. Including the LNA 22 aids in increasing signal-to-noise ratio. For example, the LNA 22 can amplify the spread spectrum signal while adding a relatively small amount of noise.

The I mixer 26a receives an I clock signal from the oscillator 24, and the Q mixer 26b receives a Q clock signal from the oscillator 24. The I clock signal and Q clock signal have about the same frequency and a phase difference equal to about 90°, and thus are quadrature clock signals. The I mixer 6a and the Q mixer 6b downconvert the amplified RF signal from the LNA 22 using the I clock signal and the Q clock signal, respectively, thereby generating a downshifted I signal and a downshifted Q signal having a quadrature phase relationship.

The selected frequency of the I clock signal and the Q clock signal achieves a desired intermediate frequency or baseband for the downshifted I signal and the downshifted Q signal. The filter 28 can be, for example, a low pass or bandpass filter used to remove undesired frequency content (for instance, undesired frequency content arising from mixing) from the downshifted I signal and the downshifted Q signal. Thus, in certain implementations the filter 28 is an intermediate frequency (IF) or zero IF filter.

In one embodiment, the RF communication system 40 uses an intermediate frequency of about 0 Hz, and the oscillator clock signals can have a frequency equal to about that of the carrier frequency of the spread spectrum signal. Using an intermediate frequency of about 0 Hz can aid in increasing the blocking resilience and can improve frequency selectivity, which can aid in reducing interference when receiving a signal over a relatively noisy frequency band.

However, the intermediate frequency can be other values. In a first example, the intermediate frequency is a non-zero intermediate frequency less than or equal to about 20 MHz. In a second example, the intermediate frequency is less than 2.5 percent of the RF channel frequency.

The filtered I and filtered Q signals from the filter 28 are provided to the analog-to-digital converter 30, which digitizes the filtered I and filtered Q signals to generate digital data representing the analog I and Q components of the spread spectrum signal. In the illustrated embodiment, the digital representations of the filtered I and filtered Q signals are further channel filtered by the channel filtering circuit 31 to generate a digital I signal and a digital Q signal for the combined demodulation and despreading circuit 32. In other implementations, the channel filtering circuit 31 is omitted and/or other types of processing, such as decimation and/or image filtering, is performed prior to combined demodulation and despreading.

The digital I signal and the digital Q signal digitally represent an in-phase component and a quadrature-phase component of the received spread spectrum signal. In certain implementations, the digital I signal and the digital Q signal each are multi-bit, for instance, four or more bits to enhance the accuracy of the digital representation of the received spread spectrum signal.

The RF communication system 40 includes the combined demodulation and despreading circuit 32, which can be implemented in accordance with any of the embodiments herein. Although one example of an RF communication system including a combined demodulation and despreading circuit is shown, the teachings herein are applicable to RF communication systems implemented in other ways.

The combined demodulation and despreading circuit 32 generates a bitstream indicating the sequence of recovered data symbols. In this embodiment, the bitstream is filtered by the demodulator/despreader output filter 34, which can be, for example, a low pass filter. For example, the demodulator/despreader output filter 34 can remove noise and harmonics from the bitstream, and can have a bandwidth optimized for a variety of data rates. In another embodiment, the demodulator/despreader output filter 34 is omitted.

The filtered bitstream is processed by the CDR circuit 36 to recover a data signal DATA and a clock signal CLK. In certain implementations, the clock signal CLK and the data signal DATA are provided to downstream circuitry, such as a digital processor, to provide further processing.

Figure 3A:
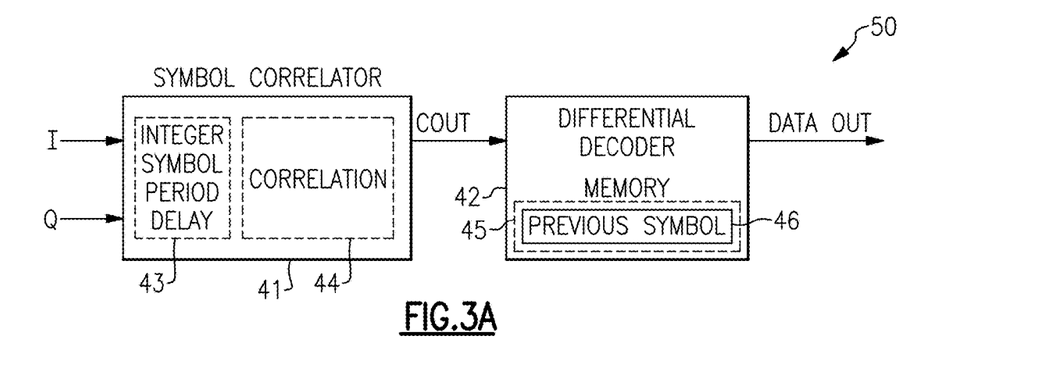
FIG. 3A is a schematic diagram of a combined demodulation and despreading circuit according to one embodiment.

FIG. 3A is a schematic diagram of a combined demodulation and despreading circuit 50 according to one embodiment. The combined demodulation and despreading circuit 50 includes a symbol correlator 41 and a differential decoder 42.

Although one embodiment of a combined demodulation and despreading circuit is shown, the teachings herein are applicable to combined demodulation and despreading circuits implemented in a wide variety of ways. Accordingly, other implementations are possible.

The symbol correlator 41 receives an I signal and a Q signal representing an in-phase component and a quadrature-phase component, respectively, of a received spread spectrum signal. The spread spectrum signal carries a sequence of data symbols each having a symbol period and coded by at least one multi-bit spreading code. The symbol correlator 41 includes integer symbol period delay circuitry 43 and correlation circuitry 44.

In the illustrated embodiment, the integer symbol period delay circuitry 43 delays the I signal and the Q signal by an integer number of the symbol periods to thereby generate a delayed I signal and a delayed Q signal, respectively. Additionally, the correlation circuitry 44 generates a correlation signal COUT based on correlating the delayed I signal to the I signal and correlating the delayed Q signal to the Q signal.

Thus, the symbol correlator 50 operates to overlay and correlate a pair of data symbols from the symbol sequence. In implementations in which the integer symbol period delay circuitry 43 operates with a delay of about one symbol period, the pair of data symbols that are correlated are adjacent data symbols in the symbol sequence.

With continuing reference to FIG. 3A, the differential decoder 42 processes the correlation signal COUT to generate a data output signal (DATA OUT) indicating the recovered sequence of data symbols. For example, the data output signal can be a serial bitstream indicating the sequence of recovered data symbols. In the illustrated embodiment, the differential decoder 42 includes a memory circuit 45 in which at least a value of the previous symbol 46 of the symbol sequence is stored.

In the illustrated embodiment, the correlation signal COUT from the symbol correlator 41 indicates whether or not the next data symbol is the same or different as the previous data symbol in the symbol sequence. Additionally, the differential decoder 42 uses the value of the previous symbol 46 and the correlation signal COUT to determine the next data symbol in the symbol sequence. In one example, the value of the previous symbol 46 stored in the memory circuit 45 is updated over time as the symbol sequence is decoded. In another example, the memory circuit 45 is used to store the full sequence of recovered data symbols.

In applications in which a spreading code is alternated for even and odd symbols (for instance, as in IEEE 802.15.4g), the memory circuit 45 of the differential decoder 42 can store both the previous odd data symbol and the previous even data symbol. Additionally, when decoding an even symbol of the symbol sequence, the differential decoder 42 uses the previous even data symbol stored in the memory circuit 45 and the value of the correlation signal COUT. Furthermore, when decoding an odd symbol of the symbol sequence, the differential decoder 42 uses the previous odd data symbol stored in the memory circuit 45 and the value of the correlation signal COUT.

In certain implementations, the I signal and the Q signal represent a spread spectrum signal that is in a packet based format. A header of a packet can include a sequence of known data symbols that are transmitted in a preamble and/or SFD. In certain implementations, the differential decoder 42 determines the symbol value of a first or initial data symbol in the symbol sequence based on comparison to a known data symbol from the header. Thus, the differential decoder 42 can use a data symbol recovered from the header as a starting point for decoding the sequence of data symbols carried in the packet's payload.

However, other implementations of determining the value of the initial data symbol of the symbol sequence are possible. For instance, in another embodiment (for example, FIG. 9), a differential decoder includes an error checking circuit that performs error checking based on assuming different values for the initial data symbol. Thus, multiple bitstreams can be decoded and processed for error checking, and the assumed symbol value corresponding to the sequence that passes error checking with no errors or the fewest errors can be assumed to be the correct initial symbol value.

Figure 3B:
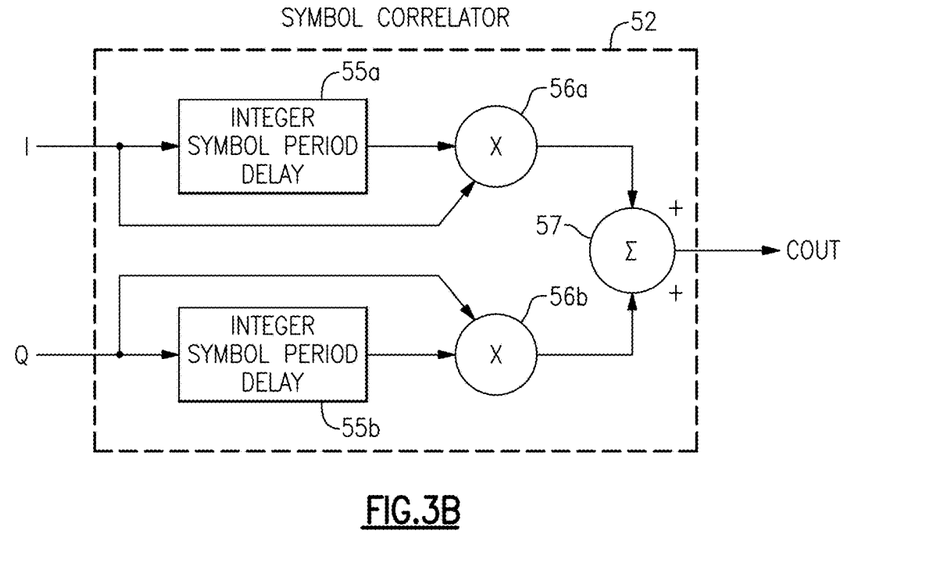
FIG. 3B is a schematic diagram of a symbol correlator according to one embodiment.

FIG. 3B is a schematic diagram of a symbol correlator 52 according to one embodiment. The symbol correlator 52 includes a first integer symbol period delay circuit 55a, a second integer symbol period delay circuit 55b, a first digital multiplier 56a, a second digital multiplier 56b, and a digital adder 57. The symbol correlator 52 receives a digital I signal and a digital Q signal, and generates a digital correlation signal COUT. The symbol correlator 52 of FIG. 3B includes circuitry implemented in a dot product mode. Although one embodiment of a symbol correlator is shown, the teachings herein are applicable to symbol correlators implemented in other ways.

In certain implementations, the digital I signal and the digital Q signal are represented by multiple bits, for instance, four or more bits. In such implementations, the illustrated circuitry can be implemented to process multi-bit digital input signals and to generate multi-bit digital output signals.

In the illustrated embodiment, the first integer symbol period delay circuit 55a delays the digital I signal to generate a delayed digital I signal, and the second integer symbol period delay circuit 55b delays the digital Q signal to generate a delayed digital Q signal. The delay provided by the first integer symbol period delay circuit 55a and the second integer symbol period delay circuit 55b is an integer number of symbol periods. The first digital multiplier 56a multiplies the digital I signal and the delayed digital I signal to generate a multiplied digital I signal, and the second digital multiplier 56b multiplies the digital Q signal and the delayed digital Q signal to generate a multiplied digital Q signal. Additionally, the digital adder 57 adds the multiplied digital I signal and the multiplied digital Q signal to generate the digital correlation signal COUT, which provides strong discrimination at the symbol level.

Figure 4:
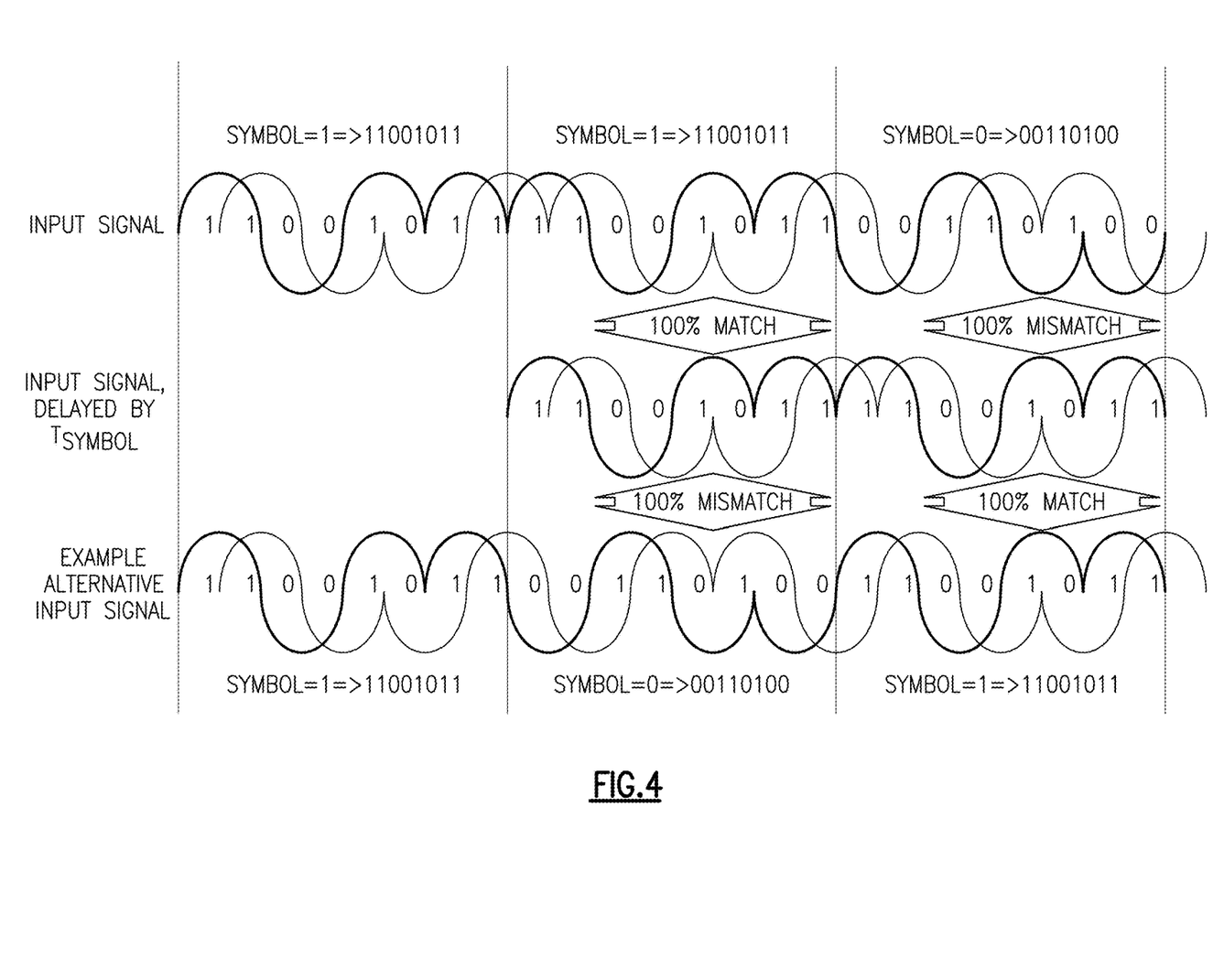
FIG. 4 is a graph of symbol-level correlation according to one embodiment.

FIG. 4 is a graph of symbol-level correlation according to one embodiment. The graph corresponds to a simulation for baseband (zero IF) I and Q input signals in which a single spread spectrum code encodes a sequence of data symbols. Additionally, each data symbol the symbol sequence sequence is either a "1" (represented by a chipping code of 11001011, in this example) or a "0" (represented by an inverse of the chipping code or 00110100, in this example).

The graph includes a top plot of I and Q input signals representing a 11,1,01 sequence, and a bottom plot of I and Q inputs representing a 11,0,11 sequence. The graph also includes a middle plot in which the top plot is delayed by the symbol period $T_{SYMBOL}$.

As shown in FIG. 4, when the second symbol is the same as the first symbol, a strong positive correlation (for instance, about 100%) is present. However, if the second symbol is an inverse of the first symbol, a strong negative correlation (for instance, about −100%) is present. Likewise, when the third symbol is an inverse of the second symbol, a strong negative correlation is present. However, when the third symbol is the same as the second symbol, a strong positive correlation is present.

Figure 5:
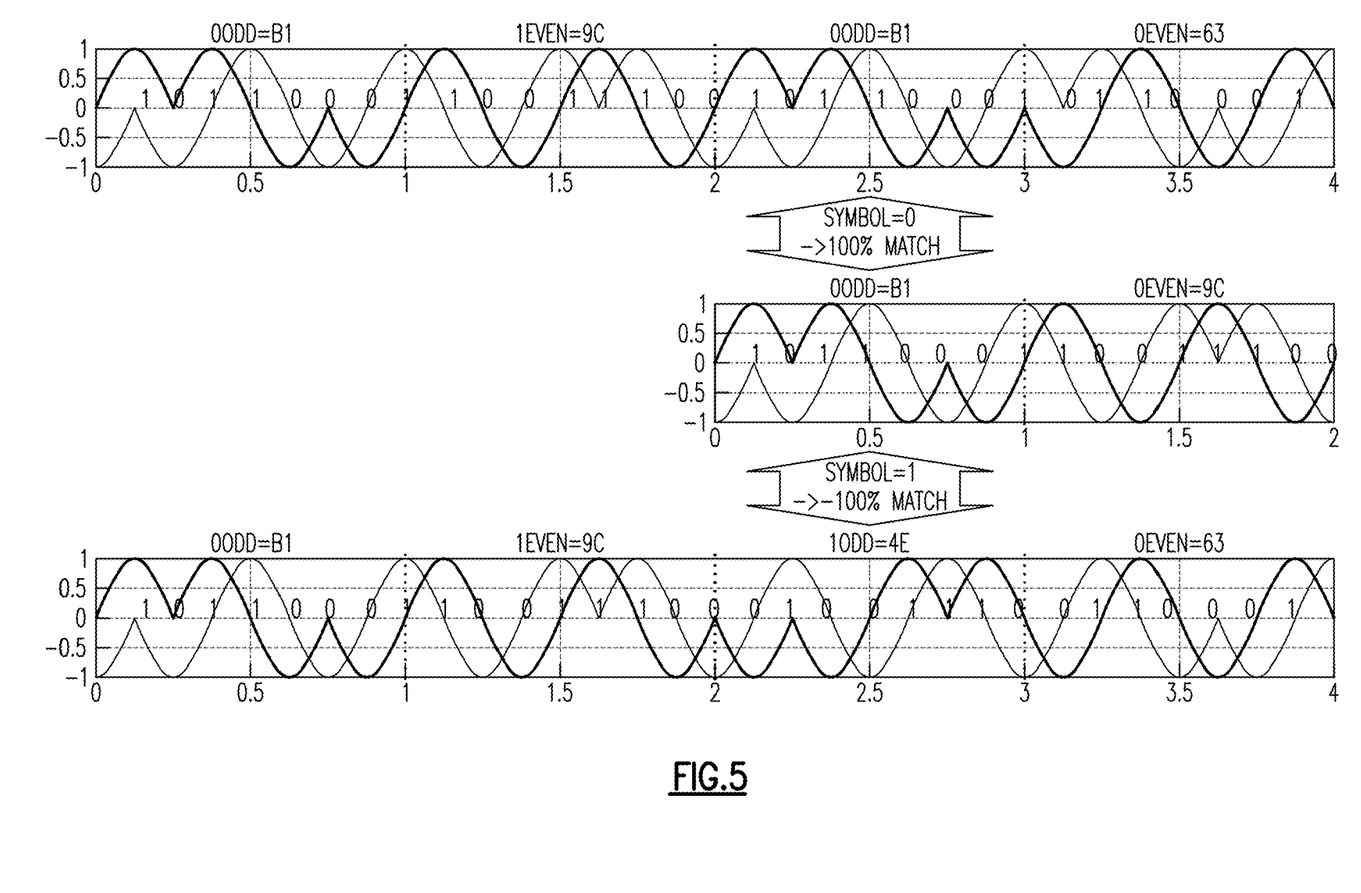
FIG. 5 is a graph of symbol-level correlation according to another embodiment.

FIG. 5 is a graph of symbol-level correlation according to another embodiment. The graph corresponds to a simulation for baseband (zero IF) I and Q input signals for the IEEE 802.15.4g-18.3 offset quadrature phase-shift keying (OQPSK) protocol, in which odd and even symbols use a different spreading code.

Although an example of DSSS is shown using two spreading codes, other implementations are possible. In another example, DSSS uses a single spreading code, with the spreading code being transmitted to represent transmission of a data bit representing a logical one ("1"), and an inverse of the spreading code (for example, in which each bit is flipped) being transmitted to represent transmission of a data bit representing a logical zero ("0").

For the simulation shown in FIG. 5, the symbol correlator operates with a delay of $2*T_{SYMBOL}$, which is suitable for receiving a IEEE 802.15.4g-18.3 OQPSK modulated signal. For example, since 802.15.4g-18.3 specifies a different (barrel shifted) spreading code for odd and even symbols, discrimination is performed on alternate symbols rather than just adjacent symbols in the symbol sequence.

With reference to FIG. 5, baseband (zero IF) signals for alternating chipping codes for 2 symbol sequences are depicted. The graph includes a top plot showing example I and Q signals for a {0,1,0,0} sequence, and a bottom plot showing example I and Q signals for a {0,1,1,0} sequence. The graph also includes a middle plot showing the top plot delayed by $2*T_{SYMBOL}$.

In this example, a data symbol of "1" for an odd symbol is represented by a binary sequence 01001110 (corresponding to hexadecimal value 4E), while a data symbol of "0" for an odd symbol is represented by the inverse binary sequence 10110001 (corresponding to hexadecimal value B1). Additionally, a data symbol of "1" for an even symbol is represented by a binary sequence 10011100 (corresponding to hexadecimal value 9C), while a data symbol of "0" for an even symbol is represented by the inverse binary sequence 01100011 (corresponding to hexadecimal value 63).

As shown in FIG. 5, when the third symbol is the same as the first symbol, a strong positive correlation (for instance, about 100%) is present. However, if the third symbol is an inverse of the first symbol, a strong negative correlation (for instance, about −100%) is present.

Thus, strong and reliable discrimination at the symbol level is provided, and demodulation and despreading is performed in one step. By performing demodulation and despreading simultaneously, constraints on synchronizing a demodulator and a despreader are removed. Furthermore, the symbol correlator can perform demodulation/despreading at the symbol rate, rather than demodulating at the chipping rate.

Although an example with baseband (zero IF) demodulation/despreading is depicted, the teachings herein are also applicable to RF communication systems operating with a non-zero intermediate frequency. In certain implementations, non-zero intermediate frequency is used and the RF communication system is implemented to operate with substantially constant signal phase for alternate symbols.

Figure 6:
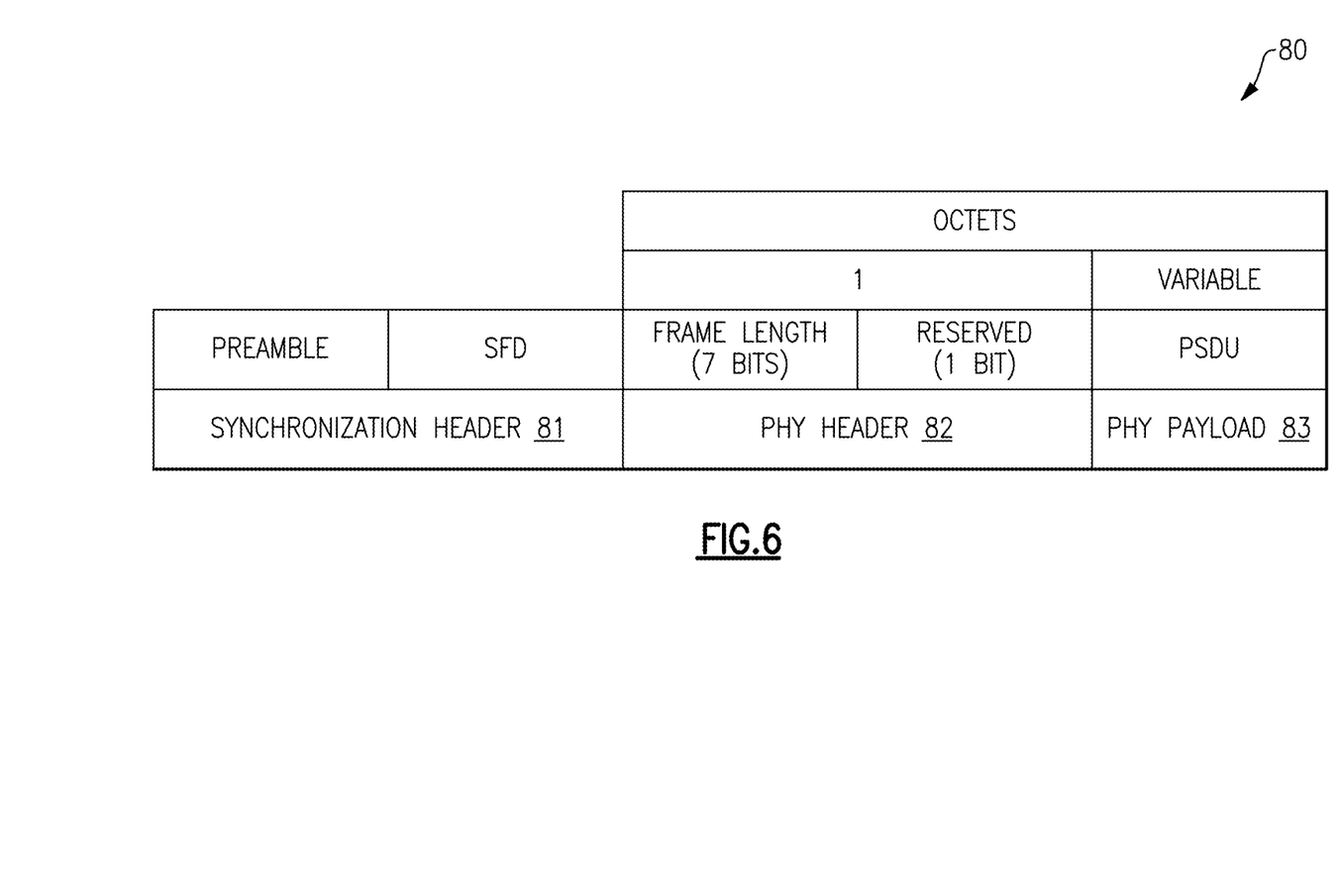
FIG. 6 is a diagram of one example of a packet structure.

FIG. 6 is a diagram of one example of a packet structure or format 80. The packet structure 80 illustrates one example of a packet format for a wireless protocol. Although one example of a packet structure is shown, the teachings herein are applicable to a wide variety of types of packet formats.

The packet structure 80 includes a synchronization header 81 including a preamble and a start of frame delimiter (SFD). The packet structure 80 further includes a physical layer (PHY) header 82 including a frame length portion (7 bits, in this example) and a reserved portion (1 bit, in this example). The packet structure 80 further includes a PHY payload 83 including a PHY service data unit (PSDU).

In this example, the PHY header includes a single octet, while the PHY payload includes a variable number of octets.

In certain implementations, an RF communication system is implemented to monitor or observe the incoming bitstream to check for known sequences associated with the synchronization header 81. For example, the RF communication system can check for the preamble and SFD. Additionally, once the synchronization header 81 is detected (for instance, when a correlation between the incoming bitstream and the know preamble and/or SFD exceeds a certain threshold) and the PHY header 82 accounted for, the data payload is stored in memory.

With continued reference to FIG. 6, when the spreading code(s) used in the SFD correspond to the spreading code(s) used in coding the subsequent symbols of the packet, the bitstream can be differentially decoded based on the last known symbols in the SFD.

Accordingly, in certain implementations herein, symbols from a header of a packet are used by a symbol correlator as initial symbol values used for decoding the remainder of the packet. For example, since the values of the symbols in the header (for instance, the SFD) are known, the symbol correlator determines whether the next data symbol is the same or an inverse of the previous known symbol from the header.

In certain communication protocols, the header can use different spreading sequence(s) relative to the payload. For example, the header's preamble and/or SFD can use a longer spreading sequence to provide higher processing gain or spreading factor (SF), thereby helping the receiver to better detect presence of a spread spectrum signal. For instance, using a longer spreading sequence for a synchronization header can provide the receiver additional margin to account for frequency and/or gain errors while the receiver is aligning frequency and signal path gain in anticipation of receiving the payload.

Figure 7:
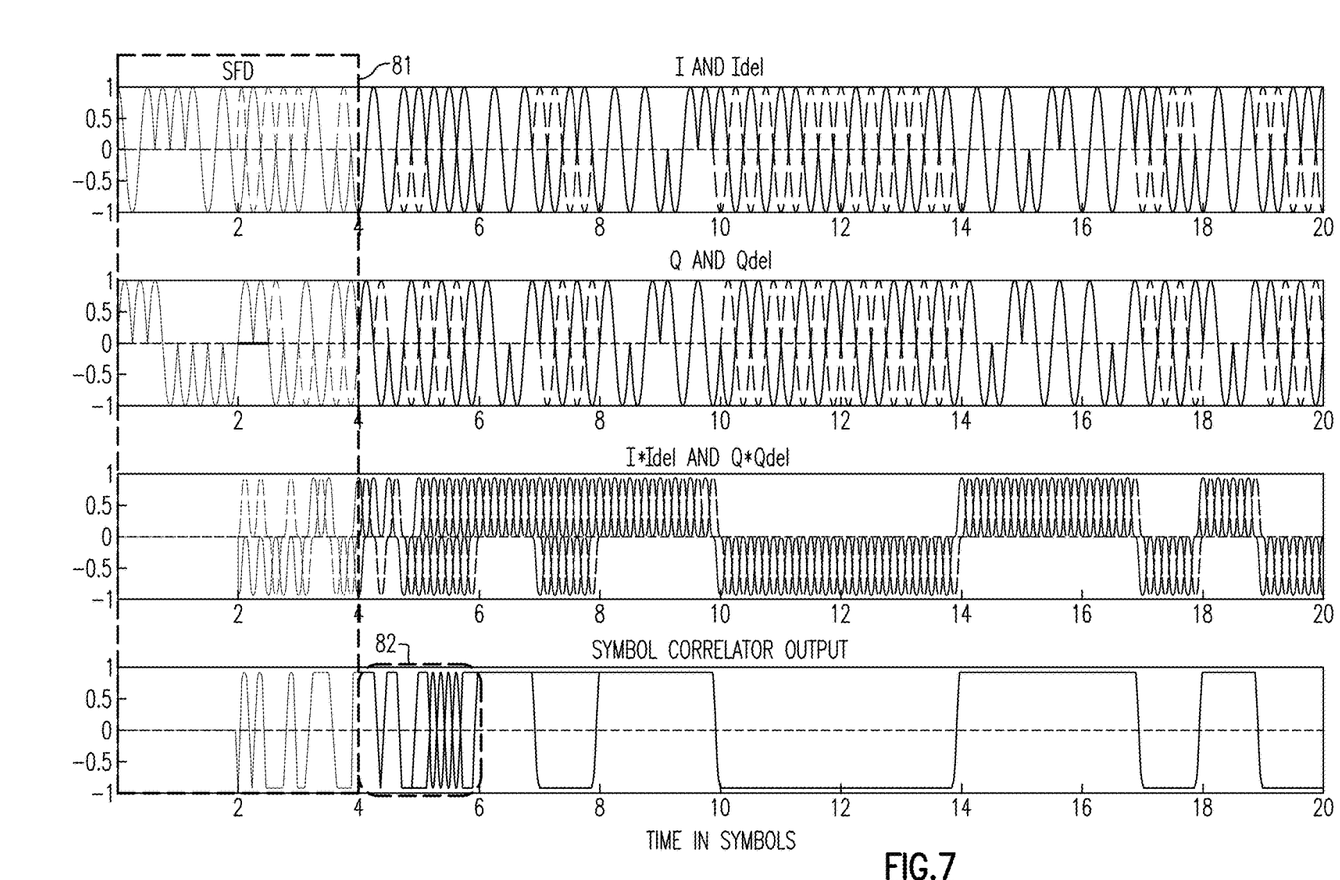
FIG. 7 is a graph of symbol-level correlation according to another embodiment.
Figure 8:
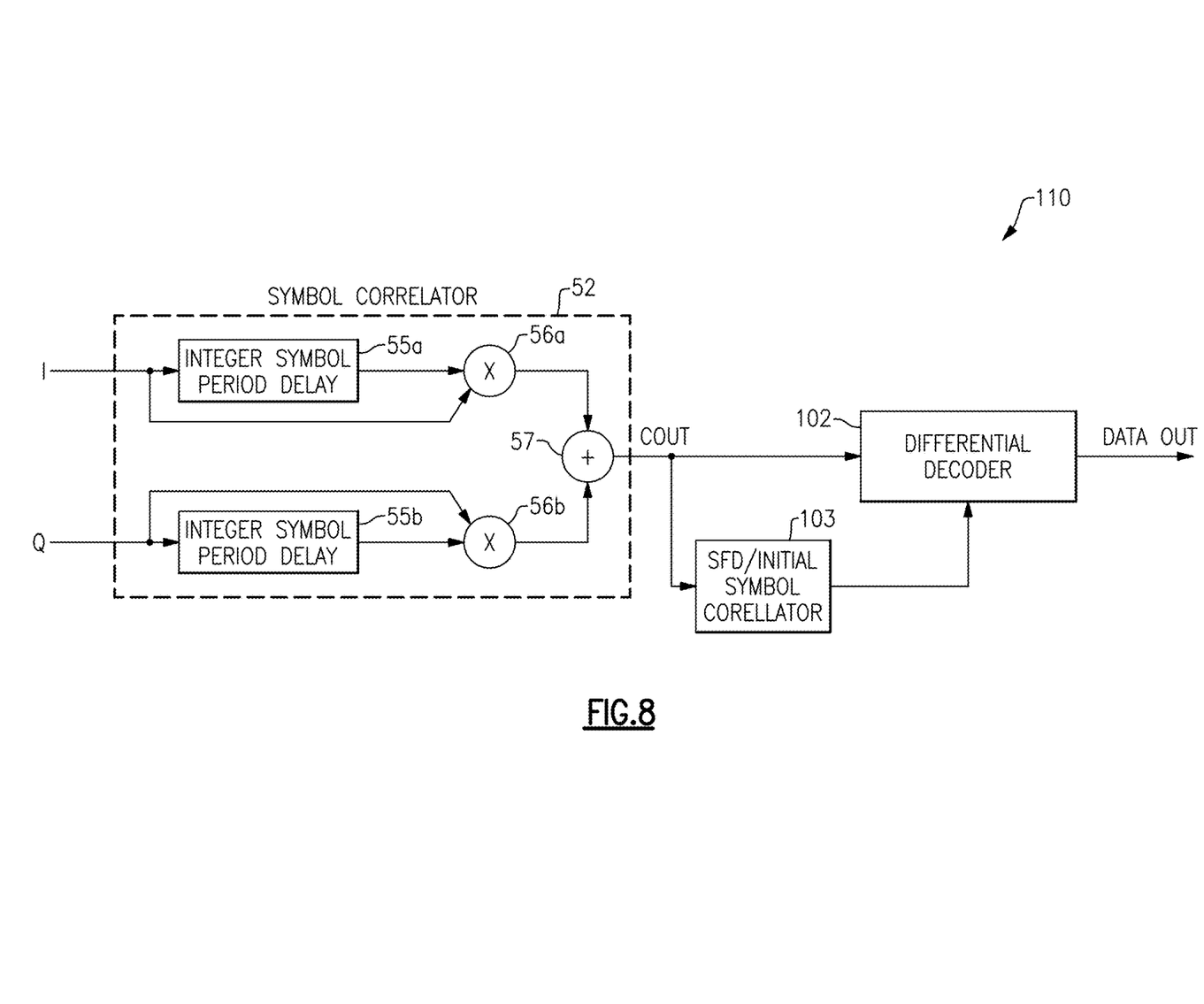
FIG. 8 is a schematic diagram of a combined demodulation and despreading circuit according to another embodiment.

In such implementations, an SFD/initial symbol correlator can be included at the output of the symbol correlator. In one example, a single spreading code is used, and the SFD/initial symbol correlator determines the polarity of the first data symbol after the SFD based on the pattern of the correlation signal during correlation of the first data symbol to the last SFD symbol. In another example, alternating spreading codes are used, and the SFD/initial symbol correlator determines the polarity of the first odd data symbol and the polarity of the first even data symbol based on the pattern of the correlation signal during correlation of the first odd data symbol to the last odd SFD symbol and correlation of the first even data symbol to the last even SFD symbol. FIGS. 7 and 8 below illustrate one example using an SFD/initial symbol correlator to determine initial symbol polarity.

FIG. 7 is a graph of symbol-level correlation according to another embodiment. The graph corresponds to a simulation for baseband (zero IF) I and Q input signals for the IEEE 802.15.4g-18.3 OQPSK protocol using the symbol correlator 52 of FIG. 3B. The graph includes an upper plot depicting the I signal and the delayed I signal (Idel), an upper middle plot depicting the Q signal and the delayed Q signal (Qdel), a lower middle plot depicting I*Idel and Q*Qdel, and a lower plot depicting the correlation signal outputted by the correlator. The simulation includes an SFD sequence 81 using different spreading codes relative to that used for subsequent data symbols in the sequence.

In this example, the symbol correlator generates complementary output patterns for both the first and second payload symbols as they are differential decoded off the last 2 effective symbols from the SFD as shown.

The strong symbol discrimination can be seen in FIG. 7. In particular, two packets are overlaid, with starting sequences {0,0} and {0,1}. The polarity of these two initial symbols are determined by the pattern they generate on the demodulator output, when differentially decoded from the end of the pilot, as can be seen between symbols four through six in section 82 of the FIG. 7.

In certain implementations herein, an SFD/initial symbol correlator is included at the output of the symbol correlator to determine the polarity of the first symbols of the payload.

FIG. 8 is a schematic diagram of a combined demodulation and despreading circuit 110 according to another embodiment. The combined demodulation and despreading circuit 110 includes a symbol correlator 52, a differential decoder 102, and an SFD/initial symbol correlator 103. The symbol correlator 52 receives an I signal and a Q signal, which are processed to generate a correlator signal COUT as described above. The differential decoder 102 processes the correlator signal COUT to recover the sequence of symbols.

In the illustrated embodiment, the SFD/initial symbol correlator 103 is included to determine the polarity of the first symbols of the payload. In one example, a single spreading code is used, and the SFD/initial symbol correlator 103 determines the polarity of the first data symbol after the SFD based on a pattern of the correlation signal COUT when correlating the first data symbol to the last SFD symbol. In another example, alternating spreading codes are used, and the SFD/initial symbol correlator 103 determines the polarity of the first odd data symbol and the polarity of the first even data symbol based on the pattern of the correlation signal COUT during correlation of the first odd data symbol to the last odd SFD symbol and correlation of the first even data symbol to the last even SFD symbol.

Figure 9:
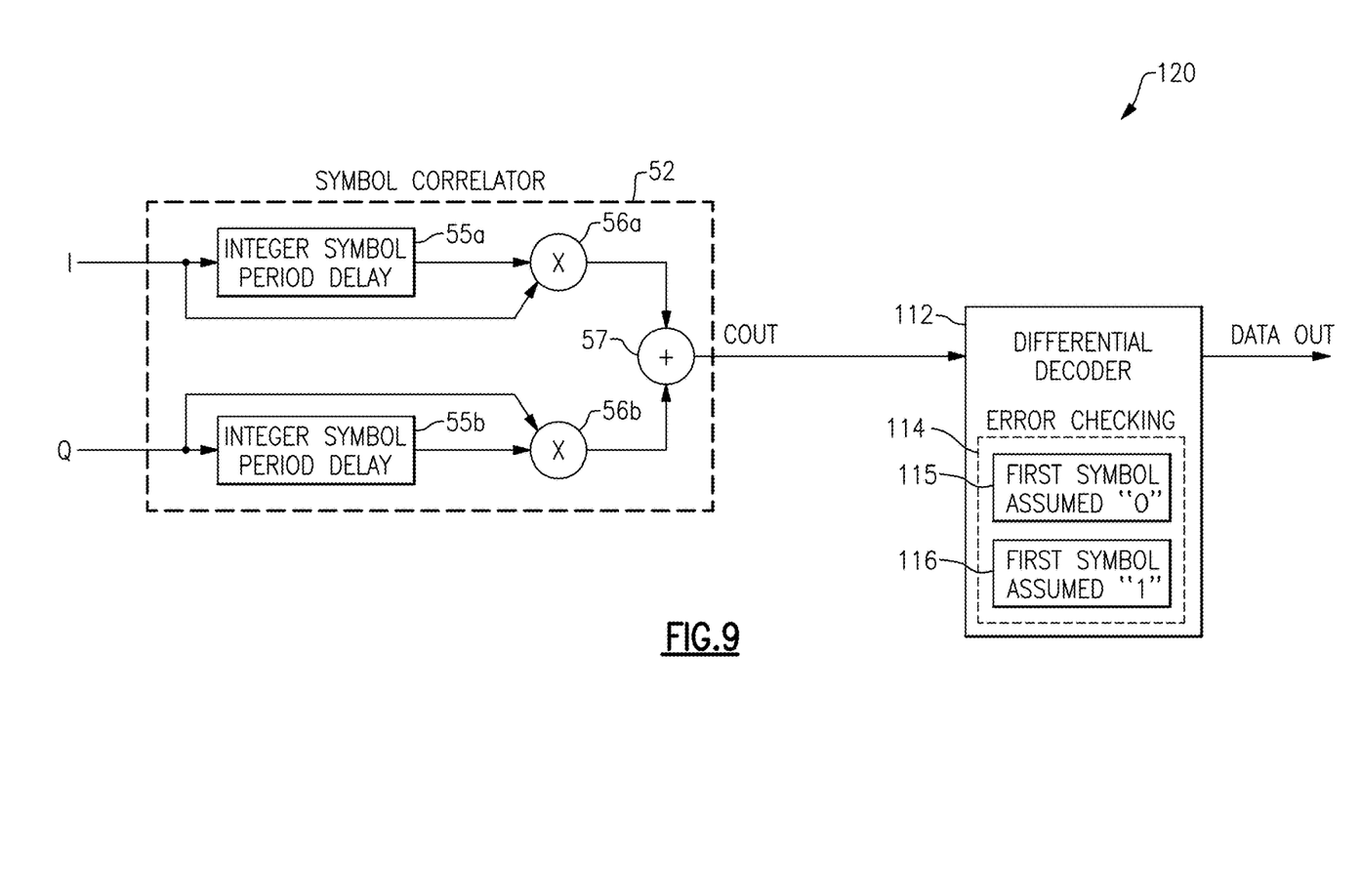
FIG. 9 is a schematic diagram of a combined demodulation and despreading circuit according to another embodiment.

FIG. 9 is a schematic diagram of a combined demodulation and despreading circuit 120 according to another embodiment. The combined demodulation and despreading circuit 120 includes a symbol correlator 52 and a differential decoder 112.

In the illustrated embodiment, the symbol correlator 52 processes the I signal and the Q signal to generate a correlation signal COUT. The differential decoder 112 processes the correlation signal COUT to recover a digital bitstream (DATA OUT).

In the illustrated embodiment, the differential decoder 112 includes error checking circuitry 114 that performs a first error check 115 assuming the first symbol received is a zero ("0") and a second error check 116 assuming the first symbol received is a one ("1"). The error checking circuitry 114 and perform a wide variety of types of error checks, including, but not limited to, a cyclic redundancy check (CRC).

By implementing the differential decoder 112 in this manner, the receiver performs packet error checking on two versions of the incoming packet. For instance, error checking is performed on a first version of the packet in which the first symbol is assumed zero, and on a second version of the packet in which the first symbol is assumed one. Additionally, based on the result of the error check, the receiver can then determine which polarity is the correct one, and decode the bitstream based on the determined polarity.

Thus, certain combined demodulation and despreading circuits herein include a differential decoder that uses error checking to determine the polarity of the first symbol. Such systems can demodulate and despread data even when receiving a packet that includes a preamble and/or SFD that uses a different spreading code than the payload.

The demodulation and despreading schemes described herein can be used in a wide range of applications, including, but not limited to, cellular, microwave, very small aperture terminal (VSAT), test equipment, and/or sensor applications. Additionally, timing offset compensation can be provided to frequency synthesizers operating at a variety of frequencies, including UHF and VHF frequencies. Accordingly, the teachings herein are applicable to a wide variety of electronic systems.

Applications

Devices employing the above described schemes can be implemented into various electronic devices. Examples of the electronic devices can include, but are not limited to, consumer electronic products, parts of the consumer electronic products, electronic test equipment, etc. Examples of the electronic devices can also include circuits of optical networks or other communication networks. The consumer electronic products can include, but are not limited to, an automobile, a camcorder, a camera, a digital camera, a portable memory chip, a washer, a dryer, a washer/dryer, a copier, a facsimile machine, a scanner, a multi-functional peripheral device, etc. Further, the electronic device can include unfinished products, including those for industrial, medical and automotive applications.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. A radio frequency (RF) communication system with combined demodulation and despreading, the RF communication system comprising:
    a pair of mixers configured to downconvert a spread spectrum signal to generate an analog in-phase (I) signal and an analog quadrature-phase (Q) signal, the spread spectrum signal carrying a sequence of data symbols coded by at least one spreading code;
    analog-to-digital conversion circuitry configured to generate digital data representing the analog I signal and the analog Q signal; and
    a combined demodulation and despreading circuit configured to delay the digital data by a delay of at least one symbol period of the sequence to generate delayed digital data, and to recover the sequence of data symbols based on correlating the delayed digital data to the digital data.

2. The RF communication system of claim 1, wherein the combined demodulation and despreading circuit is configured to recover the sequence based on determining a next data symbol of the sequence from a previous data symbol of the sequence and the correlation signal.

3. The RF communication system of claim 1, wherein the sequence is included in a payload of a packet, wherein the combined demodulation and despreading circuit is configured to determine a value of a first data symbol of the sequence based on the correlation signal and a known symbol value from a header of the packet.

4. The RF communication system of claim 1, wherein the combined demodulation and despreading circuit is configured to generate first decoded data based on a first assumed value of a first data symbol of the sequence, to generate second decoded data based on a second assumed value of the first data symbol, and to select one of the first assumed value or the second assumed value for recovering the sequence based on comparing an error check of the first decoded data to an error check of the second decoded data.

5. The RF communication system of claim 1, wherein the sequence is included in a payload of a packet, the combined demodulation and despreading circuit further configured to determine a value of a first data symbol of the sequence based on a pattern of the correlation signal when correlating a header of the packet to the first data symbol.

6. The RF communication system of claim 1, wherein the delay is one symbol period, wherein the sequence of data symbols is coded by a common spreading code.

7. The RF communication system of claim 1, wherein the delay is two symbol periods, wherein the sequence of data symbols includes a plurality of odd symbols coded by a first spreading code and a plurality of even symbols coded by a second spreading code.

8. The RF communication system of claim 1, wherein the spread spectrum signal is modulated by at least one of phase-shift keying (PSK), frequency-shift keying (FSK), or offset quadrature phase-shift keying (OQPSK).

9. A method of receiving spread spectrum signals with combined demodulation and despreading, the method comprising
    receiving a spread spectrum signal carrying a sequence of data symbols coded by at least one spreading code;
    downconverting the spread spectrum signal to generate an analog in-phase (I) signal and an analog quadrature-phase (Q) signal;
    generating digital data representing the analog I signal and the analog Q signal;
    delaying the digital data by a delay of at least one symbol period of the sequence to generate delayed digital data; and
    recovering the sequence of data symbols based on correlating the delayed digital data to the digital data.

10. The method of claim 9, wherein recovering the sequence of data symbols comprises determining a next data symbol of the sequence from a previous data symbol of the sequence and a result of correlating the delayed digital data to the digital data.

11. The method of claim 9, wherein the sequence is included in a payload of a packet, the method further comprising determining a value of a first data symbol of the sequence based on a known symbol value from a header of the packet and a result of correlating the delayed digital data to the digital data.

12. The method of claim 9, further comprising generating first decoded data based on a first assumed value of a first data symbol of the sequence, generating second decoded data based on a second assumed value of the first data symbol, and selecting one of the first assumed value or the second assumed value for recovering the sequence based on comparing an error check of the first decoded data to an error check of the second decoded data.

13. A combined demodulation and despreading circuit comprising:
    a symbol correlator configured to receive digital data including an in-phase (I) signal and a quadrature-phase (Q) signal representing a spread spectrum signal carrying a sequence of data symbols coded by at least one spreading code, the symbol correlator comprising:
        delay circuitry configured to delay the digital data by a delay of at least one symbol period of the sequence to generate delayed digital data, and
        correlation circuitry configured to generate a correlation signal based on correlating the delayed digital data to the digital data; and
    a differential decoder configured to process the correlation signal to recover the sequence of data symbols.

14. The combined demodulation and despreading circuit of claim 13, wherein the differential decoder decodes the sequence based on determining a next data symbol of the sequence from a previous data symbol of the sequence and the correlation signal.

15. The combined demodulation and despreading circuit of claim 13, wherein the sequence is included in a payload of a packet, the differential decoder configured to determine a value of a first data symbol of the sequence based on the correlation signal and a known symbol value from a header of the packet.

16. The combined demodulation and despreading circuit of claim 13, wherein the differential decoder is configured to generate first decoded data based on a first assumed value of a first data symbol of the sequence, and to generate second decoded data based on a second assumed value of the first data symbol, wherein the differential decoder selects one of the first assumed value or the second assumed value for recovering the sequence based on comparing an error check of the first decoded data to an error check of the second decoded data.

17. The combined demodulation and despreading circuit of claim 13, wherein the sequence is included in a payload of a packet, wherein the combined demodulation and despreading circuit further comprises a header correlator configured to determine a value of a first data symbol of the sequence based on a pattern of the correlation signal when correlating a header of the packet to the first data symbol.

18. The combined demodulation and despreading circuit of claim 13, wherein the delayed digital data includes a delayed I signal and a delayed Q signal, the correlation circuitry comprising a first multiplier configured to multiply the delayed I signal and the I signal to generate a first multiplied signal, a second multiple configured to multiply the delayed Q signal and the Q signal to generate a second multiplied signal, and an adder configured to generate the correlation signal based on adding the first multiplied signal and the second multiplied signal.

19. The combined demodulation and despreading circuit of claim 13, wherein the delay of the delay circuitry is one symbol period, wherein the sequence of data symbols is coded by a common spreading code.

20. The combined demodulation and despreading circuit of claim 13, wherein the delay of the delay circuitry is two symbol periods, wherein the sequence of data symbols includes a plurality of odd symbols coded by a first spreading code and a plurality of even symbols coded by a second spreading code.

* * * * *